United States Patent
Adair et al.

(10) Patent No.: US 10,081,116 B2
(45) Date of Patent: Sep. 25, 2018

(54) SAMPLE PREPARATION SAW

(71) Applicant: ILLINOIS TOOL WORKS INC., Glenview, IL (US)

(72) Inventors: Kurt G. Adair, Highland Park, IL (US); Douglas A. Ceckowski, Gurnee, IL (US); Michael F. Hart, Mundelein, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 539 days.

(21) Appl. No.: 14/420,669

(22) PCT Filed: Aug. 14, 2013

(86) PCT No.: PCT/US2013/055011
§ 371 (c)(1),
(2) Date: Feb. 10, 2015

(87) PCT Pub. No.: WO2014/028664
PCT Pub. Date: Feb. 20, 2014

(65) Prior Publication Data
US 2015/0217472 A1    Aug. 6, 2015

Related U.S. Application Data

(60) Provisional application No. 61/684,424, filed on Aug. 17, 2012.

(51) Int. Cl.
*B26D 7/26* (2006.01)
*B26D 1/12* (2006.01)
(Continued)

(52) U.S. Cl.
CPC ............... *B26D 7/26* (2013.01); *B23D 47/12* (2013.01); *B23D 59/001* (2013.01); *B26D 1/12* (2013.01);
(Continued)

(58) Field of Classification Search
CPC ...... B28D 5/045; B28D 5/0076; B24B 21/20; B24B 21/04; Y10T 83/909
(Continued)

(56) References Cited

U.S. PATENT DOCUMENTS 3,715,946 A   2/1973 Kaltenbach
4,432,260 A   2/1984 Sarurai et al.
(Continued)

FOREIGN PATENT DOCUMENTS

CN    1626301 A    6/2005
DE     270572 A1    8/1989
(Continued)

OTHER PUBLICATIONS

ISR and WO for PCT/US2013/055011 dated Mar. 19, 2014.

*Primary Examiner* — Monica Carter
*Assistant Examiner* — Lauren Beronja
(74) *Attorney, Agent, or Firm* — Levenfeld Pearlstein, LLC (57) ABSTRACT

A saw has a system for sensing the torque on a cutting blade to signal when the blade begins to cut material. The saw has a drive belt extending between a driven wheel and a drive wheel and a belt tensioner that engages a side of the belt and maintains tension in the belt. The belt tensioner is movable to maintain the tension in the belt. A control system calculates the movement of the belt tensioner. The saw has a system for determining the size of the sacrificial blade. A through beam photoelectric emitter and receiver pair are positioned on opposite sides of the blade such that a largest cutting blade is moved above the beam regardless of a horizontal position of the cutting blade and sensor senses a vertical position of the axis of the blade. The sensor senses the vertical position of the blade axis when the blade is moved above the beam.

10 Claims, 7 Drawing Sheets

(51) Int. Cl.
*B23D 59/00* (2006.01)
*B23D 47/12* (2006.01)

(52) U.S. Cl.
CPC .............. *Y10T 83/04* (2015.04); *Y10T 83/141* (2015.04); *Y10T 83/866* (2015.04)

(58) Field of Classification Search
USPC ................................................ 125/21, 16.02
See application file for complete search history.

(56) References Cited

U.S. PATENT DOCUMENTS

| | | | | |
|---|---|---|---|---|
| 6,237,585 | B1* | 5/2001 | Oishi | B23D 57/0069 125/16.02 |
| 8,126,254 | B2* | 2/2012 | Lasa | B24B 19/14 356/3.08 |
| 8,707,837 | B2* | 4/2014 | Kojima | B23D 47/12 83/471.3 |
| 2001/0035535 | A1* | 11/2001 | Hayashi | H01L 21/681 257/200 |
| 2003/0230466 | A1* | 12/2003 | Swinderman | B65G 45/12 198/497 |
| 2004/0159198 | A1 | 8/2004 | Peot et al. | |
| 2004/0163373 | A1* | 8/2004 | Adams | A01D 34/78 56/10.2 R |
| 2004/0165197 | A1 | 8/2004 | Bucher et al. | |
| 2008/0058142 | A1* | 3/2008 | Joslyn | F16H 7/1218 474/135 |
| 2008/0060208 | A1 | 3/2008 | Benuzzi | |
| 2009/0244528 | A1 | 10/2009 | Suzuki | |
| 2012/0100780 | A1* | 4/2012 | Weingart | B23D 45/02 451/5 |
| 2014/0309882 | A1* | 10/2014 | Antchak | F02B 67/06 701/36 |

FOREIGN PATENT DOCUMENTS

| | | | | |
|---|---|---|---|---|
| DE | 3905949 | A1 | 8/1990 | |
| DE | 4321230 | A1 | 3/1995 | |
| DE | 19622374 | A1 | 12/1997 | |
| DE | 19622374 | B4 | 5/2007 | |
| EP | 2476531 | A1 * | 7/2012 | ........... B23D 59/001 |
| FR | 2899685 | A1 | 10/2007 | |
| GB | 1355399 | A | 6/1974 | |
| JP | H03219901 | A | 9/1991 | |
| JP | H08164515 | A | 6/1996 | |
| JP | 2006287111 | A | 10/2006 | |
| WO | 9012669 | A1 | 11/1990 | |
| WO | 9945351 | A1 | 9/1999 | |
| WO | 2006064369 | A1 | 6/2006 | |
| WO | 2008025045 | A1 | 3/2008 | |

* cited by examiner

SAMPLE PREPARATION SAW

RELATED APPLICATIONS

The present application is a National Phase of International Application Number PCT/US2013/055011 filed Aug. 14, 2013 and claims priority of U.S. Application No. 61/684,424 filed Aug. 17, 2012.

BACKGROUND

The examination of samples, such as by metallographic examination, requires a number of preparatory steps. For example, a sample may need to be cut or sectioned to a specific size prior to mounting for examination.

Saws are known for carrying out the sectioning, e.g., cutting of samples. One such saw is disclosed in Weingart, U.S. Publication 2012-0100780, the disclosure of which is incorporated herein by reference in its entirety.

In a typical sample preparation saw, the blade is sacrificial. That is, the saw blade loses mass (and size) as cutting progresses. Blade size is lost in that the diameter of the blade is reduced as cutting is carried out.

In operation, the blade moves from a non-contact, home position vertically, along an arc, to contact the sample being cut. During the cutting operation, the blade typically moves along the arc slowly so as to properly effect the cut. Movement of the blade along the arc from the home position to the sample is also carried out at a relatively slow rate in that it is difficult to determine when the blade will contact the sample. As such, in an automated cutting operation time and efficiency (e.g., the number of samples cut in a given period of time) can be lost.

Additionally, many such saws have blades that translate laterally, parallel to the blade axis, to carry out a number of cuts in succession in the sample. During such operations, the blade returns to the home position following or between each cut. Again, because of the slow movement of the blade during the non-contact portions of cycle, it is inefficient to return the blade to the home position after each cut and prior to translation.

Accordingly, there is a need for an improved system for monitoring the position of the blade relative to a sample in a sample preparation saw. Desirably, such a system detects blade size and blade contact to vary the speed and distance that the blade travels during and between cuts of the sample.

SUMMARY

A sample preparation saw has a system for sensing the torque on a cutting blade to signal when the blade begins to cut material. The saw has a drive belt extending between a driven wheel and a drive wheel. A belt tensioner engages a side of the belt and maintains a tension in the belt. The belt tensioner is movable to maintain the tension of the belt and a control system calculates the movement of the belt tensioner.

In an embodiment, the belt tensioner is pivotable to maintain the tension in the belt. The belt tensioner pivots between first and second angles to maintain the tension in the belt. The movement between the first and second angles (i.e., a change in the angle of the belt tensioner) detects the change in torque on the cutting blade. A rotary converter can be operably mounted to the belt tensioner to detect the movement between the first and second angles.

In an embodiment, the blade is moved toward the workpiece at a first speed and when the belt tensioner moves to increase the tension in the belt, the blade is moved toward the workpiece at a second speed. The first speed is greater than the second speed.

A method for cutting an object using a saw having a moving, rotating blade, in which the blade moves in a direction parallel to the rotation of the blade, includes moving the blade in the direction toward the object at a first speed. The blade contacts the object and the speed of movement of the blade toward the object is adjusted from the first speed to a second speed different from the first speed.

In such a method, the first speed is greater than the second speed. The torque on a drive belt operably connected to the blade is sensed and the speed of movement of the blade toward the workpiece is adjusted in response to a change in the sensed torque on the belt.

In an embodiment, a saw having a system for determining the size of a sacrificial cutting blade that moves from a non-contact, home position to a sample contact position includes a through beam photoelectric emitter and receiver pair. The emitter and receiver are positioned on opposite sides of the blade and are positioned such that a largest cutting blade is moved above the beam regardless of a horizontal position of the cutting blade.

A sensor senses a vertical position of a rotational axis of the cutting blade. The sensor senses the vertical position of the blade axis when the blade is moved above the beam.

In an embodiment, the saw is mounted in a cabinet and the emitter and receiver pair are mounted near opposing walls of the cabinet with the cutting blade moving vertically therebetween. The saw blade moves in an arc from the non-contact, home position to the sample contact position.

A method is also disclosed for detecting the size of a cutting blade in a saw in which the cutting blade is a sacrificial cutting blade and in which the cutting blade moves from a non-contact, home position to a sample contact position, and in which the saw has a through beam photoelectric emitter and receiver pair positioned on opposite sides of the cutting blade and that generate a beam and a corresponding signal therebetween. In such a saw, the emitter and receiver pair generate a signal. The saw further includes a sensor for sensing a vertical position of the cutting blade axis.

The method includes positioning the blade in a low position such that the beam is blocked, moving the blade out of a path between the beam and monitoring the photoelectric sensor signal. The vertical position of the cutting blade axis is sensed and, upon sensing a predetermined criteria, the vertical position of the cutting blade is recorded. The size of the cutting blade is then calculated.

The method can includes the step of sampling photoelectric sensor signals at predetermined intervals and upon reaching a predetermined number of signals indicating an absence of the blade in the path, calculating the size of the cutting blade.

The signals generated by the emitter and receiver pair can be filtered. In an embodiment, the cutting blade moves in an arc from the non-contact, home position to the sample contact position.

These and other features and advantages of the present disclosure will be apparent from the following detailed description, in conjunction with the appended claims.

BRIEF DESCRIPTION OF THE DRAWINGS

The benefits and advantages of the present device will become more readily apparent to those of ordinary skill in the relevant art after reviewing the following detailed description and accompanying and drawings, wherein.

DETAILED DESCRIPTION

While the present device and method are susceptible of embodiment in various forms, there is shown in the drawings and will hereinafter be described presently preferred embodiments with the understanding that the present disclosure is to be considered an exemplification of the device and is not intended to be limited to the specific embodiments illustrated.

Referring now to the figures and in particular, to FIGS. 1-6, there is shown a saw 10 having a system 12 for sensing the torque on a cutting blade 14 to signal when the blade begins to cut material. The system is used in an automatic saw to reduce cycle times. By sensing the beginning of a cut the blade can be moved towards the workpiece faster and be slowed down when the cut begins. This reduces the amount of time spent "cutting air". The blade is moved toward the workpiece by a drive 15.

Figure 1:
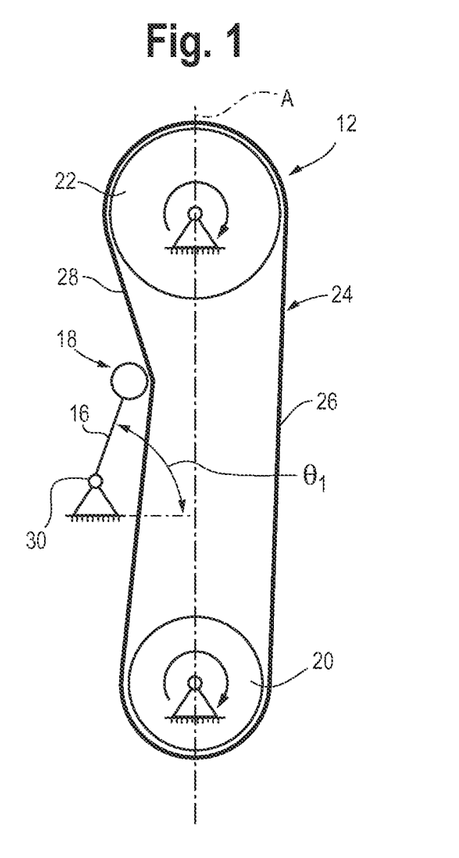
FIG. 1 is a schematic illustration of a drive belt and system for determining when the saw blade makes contact with the sample, in which the illustration shows the system when the blade is not in contact with the sample.

The system senses torque on the blade by measuring the angular change ($\theta_1$-$\theta_2$) in the arm 16 of a belt tensioner 18. FIG. 1 illustrates the system 10 when the blade is not in contact with the workpiece. As seen in FIG. 1, the system includes a drive pulley 20 (as from a motor drive), a driven pulley 22 (as mounted or operably connected to the saw blade), a drive belt 24 and the belt tensioner 18.

As torque is transmitted through the belt drivetrain, the belt 24 experiences tension proportional to the torque. The tension in the belt causes the belt to stretch. The belt stretch is taken up by the movement of the belt tensioner 18.

In FIG. 1, the blade is not in contact with the workpiece. There is a lesser amount of torque on the driven pulley 22, and thus on the drive belt 24. The right-hand side (as indicated at 26 in FIG. 1) of the belt 24 is under tension and there is some, albeit minimal slack on the left-hand side (as indicated at 28) of the belt. As such, the tensioner 18, which maintains a predetermined tension on the belt 24, is pivoted away from an axis A that extends between the pulleys.

Figure 2:
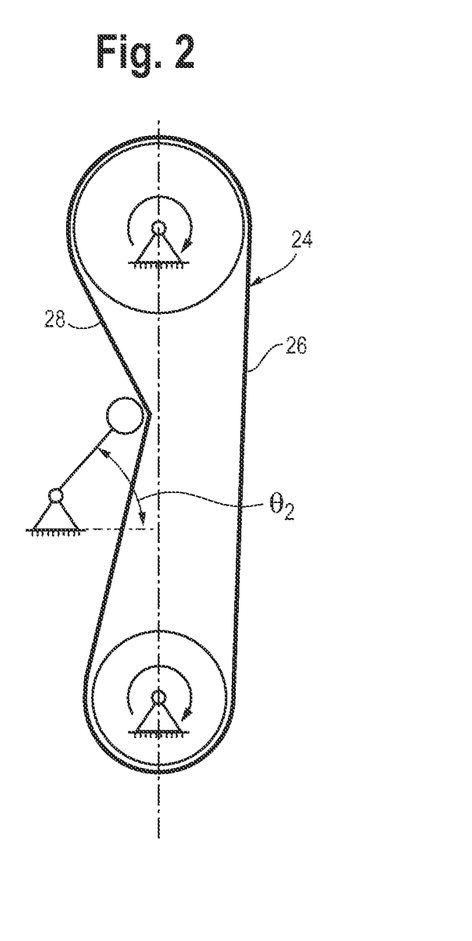
FIG. 2 is a schematic illustration similar to FIG. 1, showing the system when the blade is in contact with the sample.

As the blade contacts the material, torque is transmitted to the driven pulley 22. The belt section 26 on the right-hand side of the system comes under increased tension and the belt section 28 on the left-hand side exhibits an increase in slack. The tensioner 18, which is biased toward the belt 24, moves, e.g., pivots, toward the axis A to maintain tension in the belt 24. The change ($\theta_1$-$\theta_2$, or $\Delta\theta$) in the belt tensioner position (or angle $\theta$ relative to the a fixed location) is used to detect changes in the torque being transmitted.

In operation, as the saw begins the cutting cycle, a minimum change in the belt tensioner 18 position is detected. A baseline position is established after the blade has started rotating but before the blade begins to move towards the part. As the blade moves toward the part, the belt tensioner position is compared to the baseline and the difference ($\Delta\theta$) is determined When the blade contacts the workpiece, $\Delta\theta$ will increase. Once a preset threshold for $\Delta\theta$ is reached, the cutting cycle is triggered. The cutting cycle typically involves motion much slower than the motion when the blade is approaching the workpiece. Filtering may also be applied to the signals.

One of the advantages of this system is that measuring the angular change $\Delta\theta$ of the belt tensioner 18 can be done in a cost efficient manner by using a rotary encoder 30 or the like. Torque sensing is traditionally accomplished by sensing motor current. However, for some drive trains, such as those with other loads or large inertia, the motor current signal may be too noisy or delayed to be useful. Additionally, as motor power increases the cost to sense the current increases.

As noted above, the blades used in sample preparation saws are sacrificial. That is, they are worn down as samples are cut. Accordingly, there is also a need to be able to monitor the blade 14 size $d_{14}$, as the blade 14 is spinning, in order to efficiently operate the saw. Such a system must function under operating conditions which include coolant flow to the blade during cutting, and movement of the blade 14 toward the workpiece, as well as lateral movement of the blade 14, e.g., movement of the blade perpendicular to the cutting plane, to cut multiple samples. In one embodiment, movement of the blade toward the workpiece is along an arc.

Blade size detection is accomplished by a system 31 that includes a through beam photoelectric emitter 32 and receiver 34 pair. The sensor pair 32, 34 is placed so that the largest blade 14 can be moved above the beam regardless of the horizontal blade position (see FIG. 3). In operation, to detect the size of the blade, the blade starts from a low position such that the beam is blocked.

Figure 3:
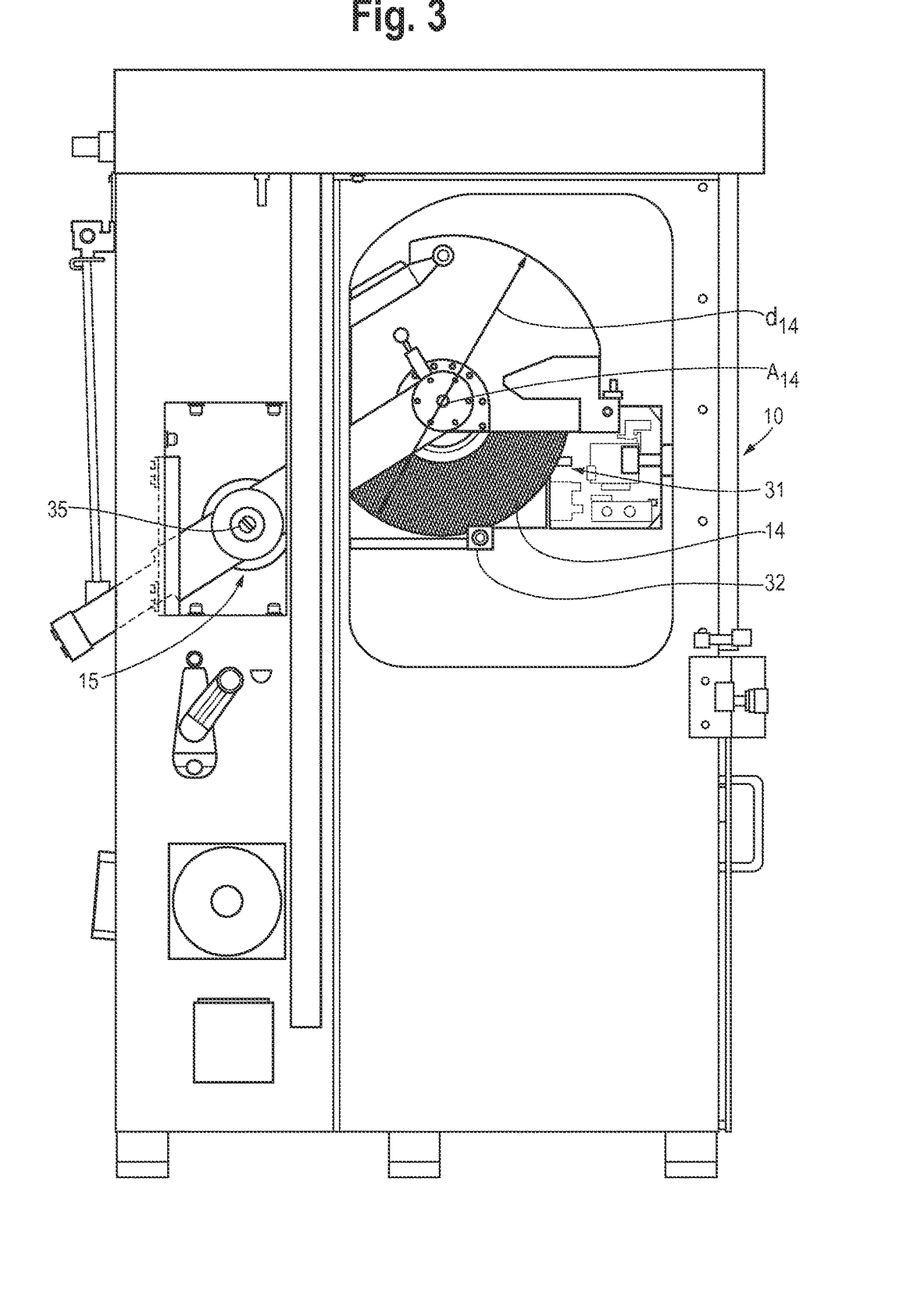
FIG. 3 is a side view of the saw cabinet and showing the location of the blade edge sensors relative to the blade edge.
Figure 4:
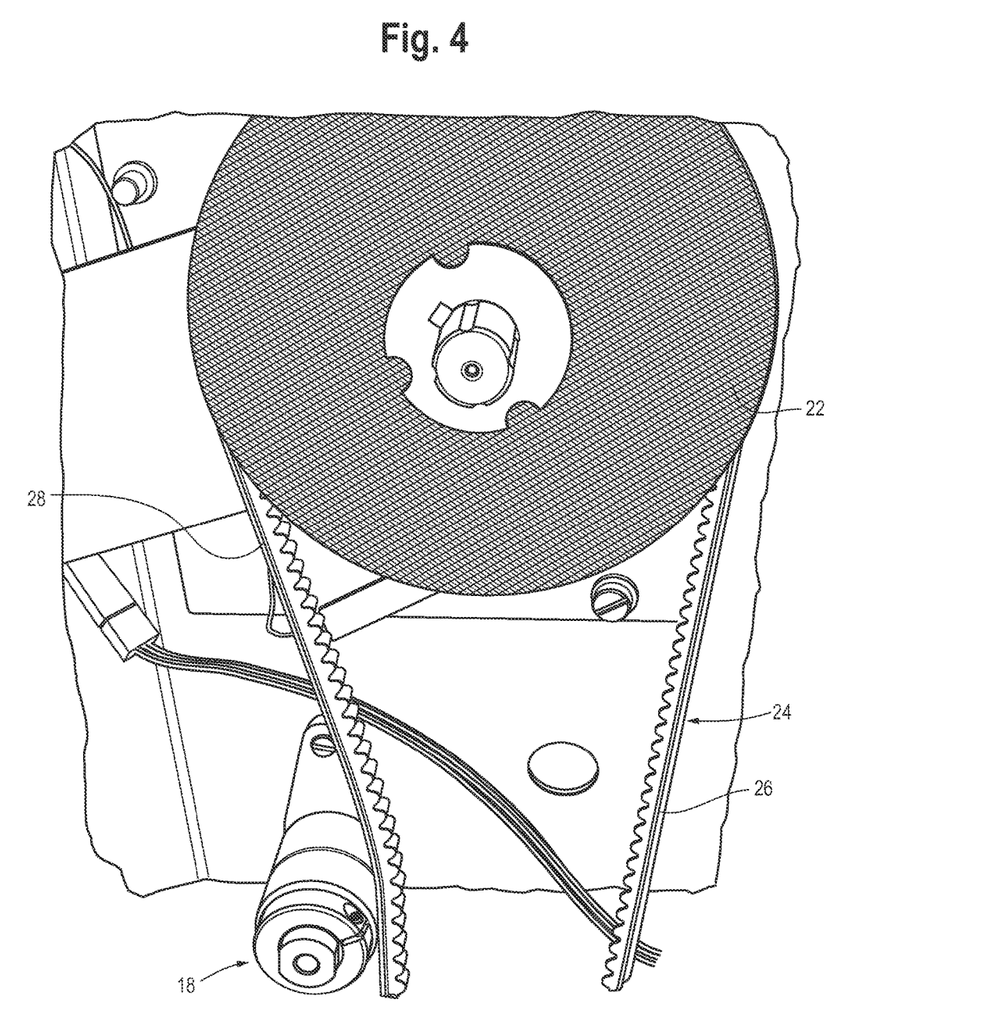
FIG. 4 is an illustration of the belt drive system showing various components thereof.
Figure 5:
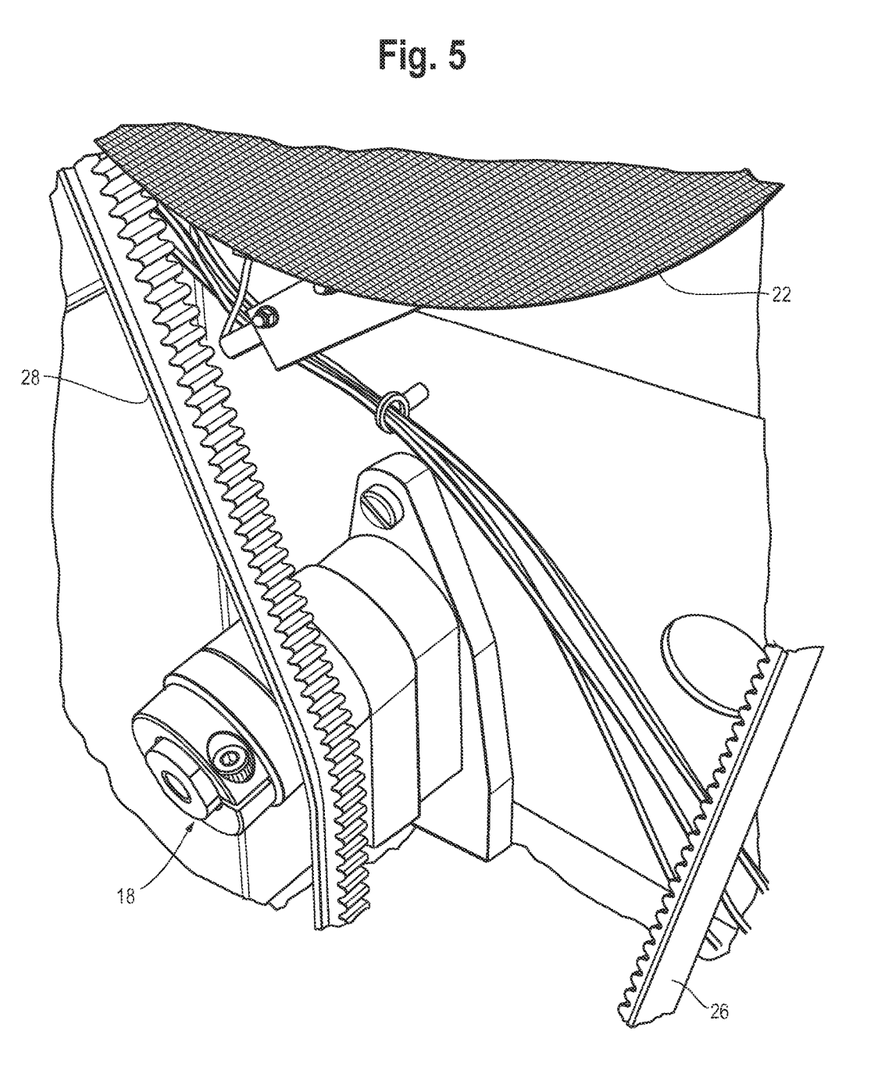
FIG. 5 is another illustration of the belt drive system showing the tensioner.
Figure 6:
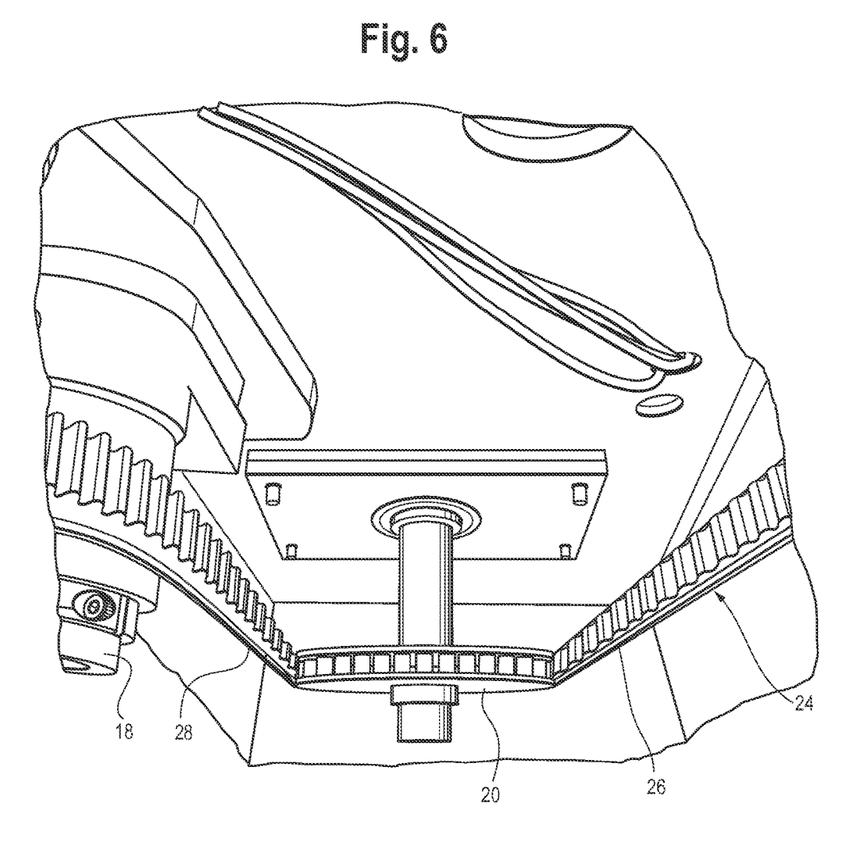
FIG. 6 is still another illustration of the belt drive system showing the blade drive wheel.
Figure 7:
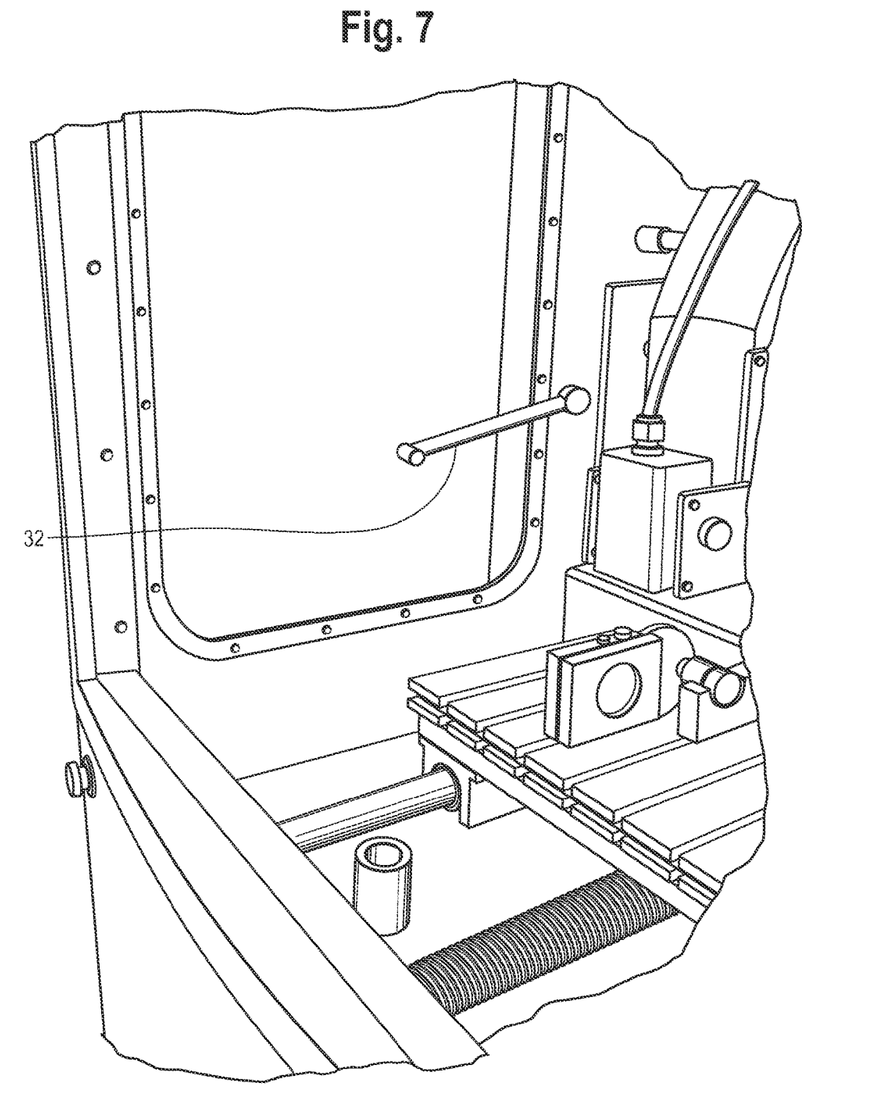
FIG. 7 is a view inside of the saw cabinet, showing the location of one of the sensors mounted in the cabinet.
Figure 8:
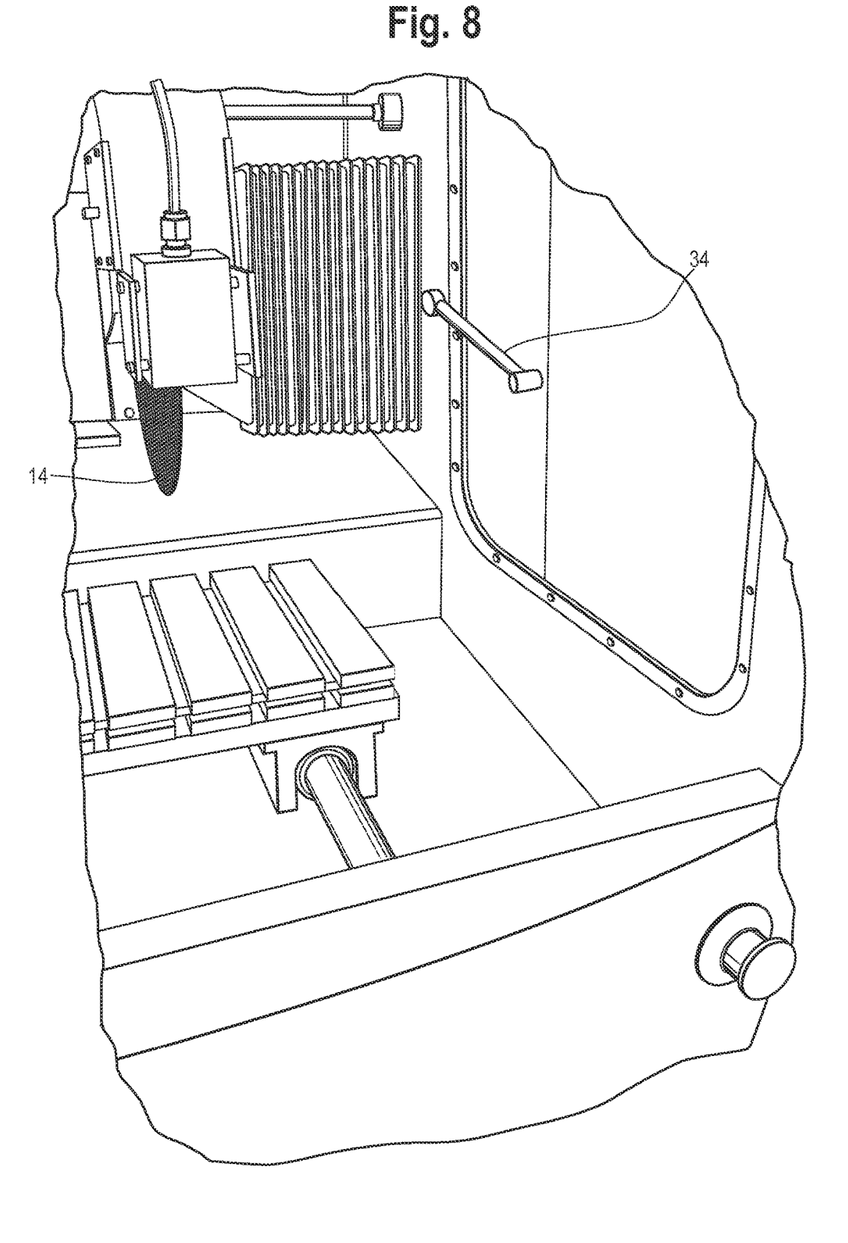
FIG. 8 is a view inside of the saw cabinet opposite of the side of FIG. 7, showing the opposite side sensor location.

The blade 14 is then pivoted or moved upward while the photoelectric sensor signal is monitored. The signal from the photoelectric receiver is filtered to reduce false signals due to coolant or other objects interfering with the beam.

When the sensor signal meets some criteria, the position of the vertical axis (of the same blade) is sensed, as by a sensor 35 and recorded. Sensor pair 32, 34 signal samples are taken every 250 μs, and the system waits for the beam to be unblocked (received) for 20 of the last 40 sensor pair 32, 34 signal samples. The blade size is then calculated by a controller 36 from the axis $A_{14}$ position sensor 35.

One of the advantages of the present blade size detection system 31 is that it is a non-contact system. As such, there are no additional wear parts needed. In addition, the system has been found to function well while the blade is spinning and coolant is flowing. This decreases the time required to sense the blade size, and increases the operating efficiency of the system by allowing for more cutting operations in a unit of time.

It will also be appreciated that in the illustrated embodiment, the sensors do not move; however, other embodiments may include sensors that move with the blade.

Those skilled in the art will recognize the programming necessary to effectuate operation and control of the systems, and will appreciate the numerous other ways in which the systems' controls can operate.

All patents referred to herein, are incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within its scope.

What is claimed is:

1. A saw having a system for sensing the torque on a cutting blade to signal when the blade begins to cut material, the saw having a drive belt extending between a driven wheel and a drive wheel, the cutting blade being operably mounted to the driven wheel and separate from the drive belt, the system comprising:
    a belt tensioner engaging a side of the belt and positioned between the driven wheel and the drive wheel, the belt tensioner maintaining a tension in the belt, the belt tensioner being pivotable to maintain the tension of the belt, wherein the belt tensioner pivots between first and second angles to maintain the tension in the belt, and wherein a movement between the first and second angles detects the change in torque on the cutting blade; and
    a control system for calculating the movement of the belt tensioner.

2. The saw of claim 1 including a rotary converter operably mounted to the belt tensioner, wherein the rotary converter detects the movement between the first and second angles.

3. The saw of claim 1 wherein the blade is moved toward the workpiece at a first speed and wherein when the belt tensioner moves to increase the tension in the belt, the blade is moved toward the workpiece at a second speed.

4. A saw having a system for determining the size of a cutting blade used in the saw, the cutting blade being a sacrificial cutting blade, the cutting blade moving from a non-contact, home position to a sample contact position, comprising:
    a through beam photoelectric emitter and receiver pair, the emitter and receiver positioned on opposite sides of the cutting blade, the emitter and receiver pair positioned such that a largest cutting blade is moved above the beam regardless of a horizontal position of the cutting blade, the emitter and receiver pair generating signals indicating the absence of the cutting blade between the emitter and receiver pair;
    a controller, the controller receiving the signals from the emitter and receiver pair; and
    a blade axis position sensor for sensing a vertical position of a rotational axis of the cutting blade and for generating a blade position signal to the controller,
    wherein the sensor senses the vertical position of the rotational axis of the cutting blade when the cutting blade is moved above the beam, and wherein the controller calculates the blade size based upon the emitter and receiver pair signal and the blade position signal.

5. The saw of claim 4 wherein the saw is mounted in a cabinet and wherein the emitter and receiver pair are mounted near opposing walls of the cabinet with the cutting blade moving vertically therebetween.

6. The saw of claim 4 wherein the cutting blade moves in an arc from the non-contact, home position to the sample contact position.

7. A method for detecting the size of a cutting blade in a saw in which the cutting blade is a sacrificial cutting blade and in which the cutting blade moves from a non-contact, home position to a sample contact position, the saw having a through beam photoelectric emitter and receiver pair, the emitter and receiver positioned on opposite sides of the cutting blade and generating a beam therebetween, the emitter and receiver pair generating a signal indicating the absence of the cutting blade between the emitter and receiver pair, the saw further including a sensor for sensing a vertical position of a rotational axis of the cutting blade, and a controller, the method comprising the steps of:
    positioning the blade in a low position such that the beam is blocked;
    moving the blade out of a path between the beam and monitoring the photoelectric sensor signal;
    generating a signal that the blade is out of the path of the beam;
    sensing the vertical position of the rotational axis of the cutting blade and upon sensing a predetermined criteria, recording the vertical position of the cutting blade;
    generating a signal indicting the vertical position of the cutting blade; and
    calculating the size of the cutting blade based upon receipt of the signal that the blade is out of the path of the beam and the signal indicating the vertical position of the cutting blade.

8. The method of claim 7 including the step of sampling photoelectric sensor signals at predetermined intervals and upon reaching a predetermined number of signals indicating the absence of the blade in the path of the beam to calculate the size of the cutting blade.

9. The method of claim 7 including the step of filtering the signal generated by the emitter and receiver pair.

10. The method of claim 7 wherein the cutting blade moves in an arc from the non-contact, home position to the sample contact position.

* * * * *